(12) United States Patent
Mohammed et al.

(10) Patent No.: US 11,854,270 B1
(45) Date of Patent: Dec. 26, 2023

(54) VEHICLE OFF-GUARD MONITORING SYSTEM

(71) Applicant: GM Global Technology Operations LLC, Detroit, MI (US)

(72) Inventors: Abbas Mohammed, Whitby (CA); Joseph F. Szczerba, Grand Blanc, MI (US); Fahim Javid, Pickering (CA); Dhruv Patel, Oshawa (CA); Paul E. Krajewski, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/824,244

(22) Filed: May 25, 2022

(51) Int. Cl.
| | |
|---|---|
| *G06V 20/56* | (2022.01) |
| *B60R 25/30* | (2013.01) |
| *G06V 10/75* | (2022.01) |
| *G06V 20/52* | (2022.01) |
| G06V 20/58 | (2022.01) |
| B60R 25/102 | (2013.01) |
| B60R 25/31 | (2013.01) |

(52) U.S. Cl.
CPC ............ *G06V 20/56* (2022.01); *B60R 25/302* (2013.01); *B60R 25/305* (2013.01); *G06V 10/751* (2022.01); *G06V 20/52* (2022.01); B60R 25/102 (2013.01); B60R 25/31 (2013.01); B60R 2325/205 (2013.01); G06V 20/58 (2022.01)

(58) Field of Classification Search
CPC ........ G06Q 50/00; G60Q 50/30; G60Q 20/14; G60Q 20/145; B60Q 1/00; B60W 30/18; B60W 30/18018; G08B 21/00; G08C 19/00; G06F 19/00; F02N 11/00; F02N 11/003; F02N 11/08; G06V 20/00; G06V 20/50; G06V 20/56; G06V 20/90
See application file for complete search history.

(56) References Cited

U.S. PATENT DOCUMENTS

| | | | |
|---|---|---|---|
| 10,371,112 B1* | 8/2019 | Khafagy | ............... F02N 11/084 |
| 2005/0046584 A1* | 3/2005 | Breed | ................... G01S 7/4802 |
| | | | 340/13.31 |
| 2014/0309789 A1* | 10/2014 | Ricci | ....................... G06F 16/25 |
| | | | 700/276 |
| 2014/0310075 A1* | 10/2014 | Ricci | ................... B60W 50/085 |
| | | | 705/13 |

OTHER PUBLICATIONS

NPL Search (Apr. 26, 2023).*

* cited by examiner

*Primary Examiner* — Van T Trieu
(74) *Attorney, Agent, or Firm* — Vivacqua Crane PLLC (57) ABSTRACT

A vehicle off-guard monitoring system includes an automobile vehicle having multiple sensor inputs capturing sensor data representing hazards including garage fires, excessive water or flooding, rain, snow, and at least one person loitering proximate to the automobile vehicle. A database has multiple saved images of the hazards. A computer compares the multiple saved images to the sensor data captured by the multiple inputs to identify if at least one match exists between any one of the multiple saved images of the hazards and the sensor data and when the at least one match exists generating a predefined warning signal. A smart-phone application in communication with the computer and a remote system signals the predefined warning signal to a user of the automobile vehicle to mitigate against damage occurring to the automobile vehicle.

10 Claims, 6 Drawing Sheets

VEHICLE OFF-GUARD MONITORING SYSTEM

INTRODUCTION

The present disclosure relates to a monitoring system to monitor a surrounding area of an automobile vehicle for hazard conditions.

Automobile vehicles are commonly provided with multiple sensors to identify ambient and driving conditions during a driving event, to monitor vehicle engine or battery conditions, and to notify a driver or passenger in the automobile vehicle of conditions or hazards that may be encountered during the driving event. When parked and with the vehicle ignition OFF, multiple types of ambient conditions may also define hazardous conditions to the host automobile vehicle which are not currently being monitored or mitigated. These hazardous ambient conditions may include but are not limited to fire hazards, for example due to a vehicle fire in proximity to the host automobile vehicle, a flooding event having rising water levels for example during a flood occurring due to local river flooding or storm activity which may inundate the host automobile vehicle, weather events such as rain or snow which may occur when one or more windows of the host automobile vehicle are open or partially open, and when one or more people are in close proximity to the host automobile vehicle that may be attempting to break into the host automobile vehicle, or are within a potential operating window if the host automobile will be started and operated.

Thus, while current automobile vehicle monitoring systems achieve their intended purpose, there is a need for a new and improved vehicle off-guard monitoring system.

SUMMARY

According to several aspects, a vehicle off-guard monitoring system includes an automobile vehicle having multiple sensor inputs capturing sensor data representing hazards including garage fires, excessive water or flooding, rain, snow, and at least one person loitering proximate to the automobile vehicle. A database has multiple saved images of the hazards. A computer compares the multiple saved images to the sensor data captured by the multiple inputs to identify if at least one match exists between any one of the multiple saved images of the hazards and the sensor data and when the at least one match exists generating a predefined warning signal. A smart-phone application in communication with the computer and a remote system signals the predefined warning signal to a user of the automobile vehicle in time to mitigate against damage occurring to the automobile vehicle.

In another aspect of the present disclosure, the multiple sensor inputs include multiple on-demand security video surveillance cameras capturing visual data proximate to the automobile vehicle also representing the hazards.

In another aspect of the present disclosure, at least one zone of coverage of at least one of the multiple cameras is selected by the user of the automobile vehicle.

In another aspect of the present disclosure, an on-board database is in communication with the computer wherein a classification of hazard data in the on-board database is separated to distinguish different degrees of the hazards.

In another aspect of the present disclosure, the classification of hazard data defines different working thresholds to distinguish between the different degrees of the hazards.

In another aspect of the present disclosure, high voltage contacts are opened upon generation of the predefined warning signal to terminate a charging operation of the automobile vehicle.

In another aspect of the present disclosure, the multiple sensor inputs include temperature sensors, humidity models and air quality sensors.

In another aspect of the present disclosure, the automobile vehicle defines an autonomous vehicle operated following generation of the predefined warning signal to automatically move the automobile vehicle away from the hazards.

In another aspect of the present disclosure, a human machine interface is in communication with the computer. The human machine interface and the computer are positioned together within the automobile vehicle. The human machine interface and the smart-phone application are independently operated to enable operation of the multiple sensors.

In another aspect of the present disclosure, a rain event and a snow event included in the hazard conditions A vehicle window position is included in the predefined warning signal when one of the rain event and the snow event is present.

According to several aspects, a method for operating a vehicle off-guard monitoring system of an automobile vehicle includes: capturing multiple sensor inputs defining sensor data representing hazards including garage fires, excessive water or flooding, rain, snow, and at least one person loitering proximate to the automobile vehicle; saving multiple images of the hazards in a database; comparing the multiple saved images to the sensor data captured by the multiple inputs in a computer to identify if at least one match exists between any one of the multiple saved images of the hazards and the sensor data; generating a predefined warning signal when the at least one match exists; and signaling the predefined warning signal to a user of the automobile vehicle to mitigate against damage occurring to the automobile vehicle.

In another aspect of the present disclosure, the method further includes upon determining the match exists: performing a continuing periodic check to identify if a rise in area temperature is occurring; determining if a change in outside humidity is occurring; conducting a reading of air quality using air quality sensors; and comparing the rise in temperature to a predetermined temperature threshold, and if the rise in temperature greater than the temperature threshold is YES, generating a fire hazard signal and sending the fire hazard signal as the predefined warning signal to the user via a fire hazard notification.

In another aspect of the present disclosure, the method further includes: determining if the match exists between external images collected by the surveillance cameras and data retrieved from an on-board database signifying a flooding event defining a rising water level is present in a proximity of the automobile vehicle; conducting a periodic check to identify if a rise in area humidity is occurring when the rising water level is present by a sequential image comparison; and comparing the rise in area humidity and the rising water level to a predetermined humidify threshold and a water level threshold and if the rise in area humidity and the rising water level greater than a humidity and water level threshold is YES, a water level hazard signal is generated and sent to the user via a flooding notification.

In another aspect of the present disclosure, the method further includes: determining if a first timer is greater than a first time threshold and a delta temperature is greater than a first temperature threshold; identifying if a second timer is greater than a second time threshold and a water level is greater than the water level threshold; and opening a contactor to terminate a vehicle charging operation.

In another aspect of the present disclosure, the method further includes capturing visual data proximate to the automobile vehicle also representing the hazards using multiple on-demand security video surveillance cameras.

In another aspect of the present disclosure, the method further includes selecting at least one zone of coverage of at least one of the surveillance cameras by the user.

In another aspect of the present disclosure, the method further includes using a smart-phone application in communication with the computer and a remote system.

According to several aspects, a method for operating a vehicle off-guard monitoring system of an automobile vehicle comprises: enabling multiple sensor inputs including multiple on-demand security video surveillance cameras, temperature sensors, humidity models and air quality sensors individually capturing visual data proximate to the automobile vehicle representing multiple hazards, and defining the multiple sensor inputs as garage fires, excessive water or flooding, rain, snow, and at least one person loitering proximate to the automobile vehicle; saving multiple images of the hazards in a database; comparing the multiple saved images to the multiple sensor inputs in a computer to identify if at least one match exists between any one of the multiple sensor inputs and any one of the multiple hazards; and generating a predefined warning signal when the at least one match exists.

In another aspect of the present disclosure, the method further includes signaling the predefined warning signal to a user of the automobile vehicle to mitigate against damage occurring to the automobile vehicle.

In another aspect of the present disclosure, the method further includes using a smart-phone application in communication with the computer and a remote system when signaling the predefined warning signal.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
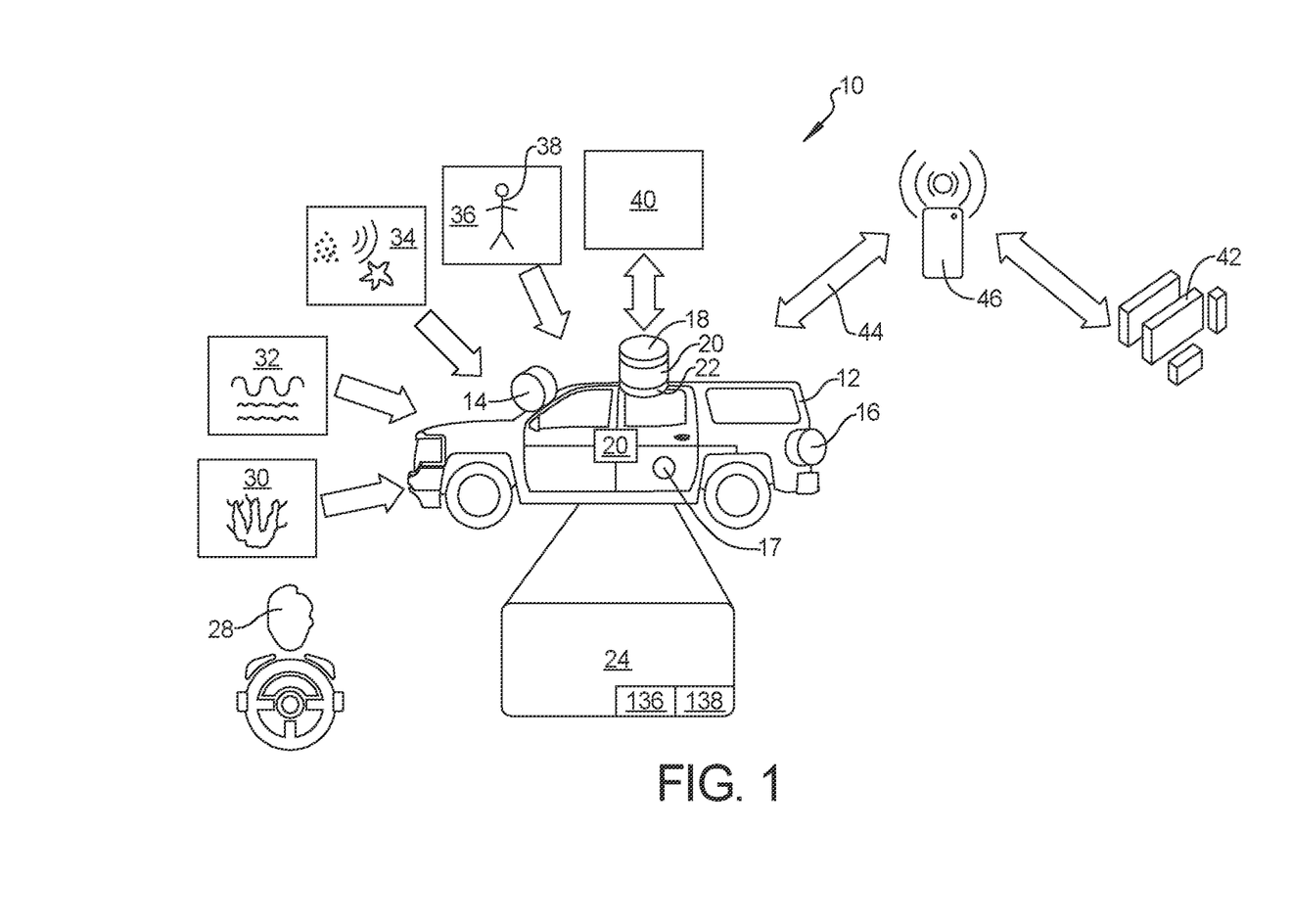
FIG. 1 is a system diagram of a vehicle off-guard monitoring system according to an exemplary aspect; according to an exemplary aspect.

Referring to FIG. 1, a vehicle off-guard monitoring system 10 is provided for a host automobile vehicle, hereinafter automobile vehicle 12, which may define a gasoline powered vehicle, an electrically powered (battery operated) vehicle, an autonomously driven vehicle or an autonomous driving system of an automobile vehicle. The automobile vehicle 12 may define a passenger vehicle, a for-hire transportation vehicle, a sport utility vehicle, and a truck or van. The automobile vehicle 12 is provided with at least one and according to several aspects multiple data collection devices, which may include but are not limited to a camera system having at least a forward-facing camera 14, a rear-facing camera 16 and optionally one or more side facing cameras 17, one or more temperature sensors 18 sensing for example an ambient temperature of an area proximate to the automobile vehicle 12, a humidity model 20 collecting ambient humidity data, and one or more air quality sensors 22. It is noted any one of the cameras may be singularly operated or all of the cameras may be selected and enabled for operation simultaneously. The multiple data collection devices collect data from multiple sources. A data collection unit 24 receives the data collected by the multiple data collection devices. For example, the data may be received by the data collection unit 24 when a system enablement request 26 is submitted by a "user" 28 of the automobile vehicle 12, wherein "user" is defined herein for example as a vehicle owner or operator who is not present at the automobile vehicle 12, an owner or operator present in the automobile vehicle 12 or a passenger of the automobile vehicle 12 who may be present or not present at the automobile vehicle 12 and compared against sample images saved in a memory discussed in greater detail in reference to FIG. 4.

The data collected may define and may therefore differ between one or more hazard events, including a fire hazard 30, a water hazard 32 such as a flooding event, a weather hazard 34 such as rain, snow, wind or ice, and a proximity hazard 36 such as a person 38 loitering in proximity to the automobile vehicle 12. The collected data may be combined in entirety or as portions of the collected data into a data hazard group 40 which may be stored in the data collection unit 24 of the automobile vehicle 12 or may be stored at a remote server 42 via a remote request 44 forwarded to the remote server 42 via a wireless device 46 such as a smart phone operated by the user 28. Some or all of the collected data of the data hazard group 40 may be retrieved on-demand from the remote server 42 and returned to the data collection unit 24.

Referring to FIG. 2 and again to FIG. 1, the vehicle off-guard monitoring system 10 may be implemented using components identified in a system component diagram 48. Control of the vehicle off-guard monitoring system 10 may be performed using an individual device such as a computer 50, a software component or an on-board computer, hereinafter collectively referred to as the computer 50. The computer 50 may be deployed in the automobile vehicle 12 with perception capabilities.

Figure 2:
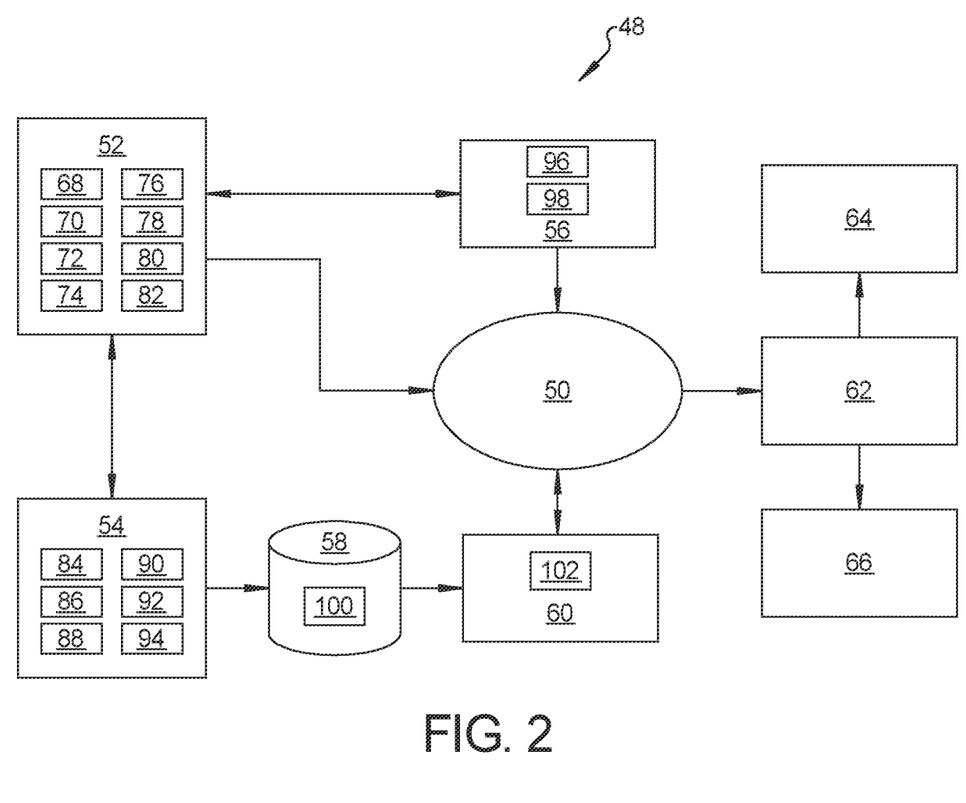
FIG. 2 is a system component diagram identifying features associated with the vehicle off-guard monitoring system of FIG. 1.

System components in communication with the computer 50 may include an on-board hardware input unit 52, an off-board input unit 54, a back-office unit 56 which may communicate with the remote server 42 described in reference to FIG. 1, multiple data servers 58 which communicate between the off-board input unit 54 and a data and communication network 60. The data and communication network 60 communicates directly with the computer 50. The computer 50 is also in communication with a human-machine-interface (HMI) processor 62, which separately communicates with a center stack display 64 within the automobile vehicle 12 providing visual system data to the user 28 of the automobile vehicle 12, and a mobile application 66 which may be saved in and operated using the wireless device 46.

According to several aspects, the on-board hardware input unit 52 collects inputs including an outside air temperature 68 in the ambient area of the automobile vehicle 12, an outside air quality 70, global positioning system coordinates 72 and map data of the automobile vehicle 12, and a vehicle speed 74 if the automobile vehicle 12 is in motion or registering a zero-vehicle speed if the automobile vehicle 12 is parked. The on-board hardware input unit 52 further collects inputs including an outside air humidity model 76, external camera and sensor data 78, vehicle heating, ventilation and air-conditioning control data 80 and position data 82 representing operating positions of the automobile vehicle movable windows.

According to several aspects, the off-board input unit 54 receives input data including global positioning system coordinates 84 and map data of items identified in the proximate area of the automobile vehicle 12, provides Internet communication links 86, and road database data 88 in the proximate area of the automobile vehicle 12. The off-board input unit 54 further receives input data including to and from a vehicle assistance system 90 which may be a support system separately purchased by the user 28 of the automobile vehicle 12, traffic data 92 which may be available for example from the Internet, and vehicle-to-vehicle (V2X) data 94 if available.

According to several aspects, the back-office unit 56 may communicate with a software subscription service 96 which may include a service such as OnStar®. The back-office unit 56 may also communicate with a live data broadcast 98, for example via the Internet.

The data servers 58 may include one or multiple data devices 100 located within the automobile vehicle 12 or remotely, for example within the remote server 42. The data and communication network 60 may include network communication devices 102 which may be directly or indirectly connected to the computer 50.

Referring to FIG. 3 and again to FIGS. 1 through 2, an enablement condition flowchart 104 identifies conditions necessary to initiate operation of the vehicle off-guard monitoring system 10. Following an initial enabling condition start command 106 provided by the user 28 of the automobile vehicle 12 a first condition decision 108 is performed. During the first condition decision 108, IF a user enabled operation condition of the vehicle off-guard monitoring system 10==TRUE, a first YES identifier 110 is generated and in an enablement operation block 112 at least one feature of the vehicle off-guard monitoring system 10 is enabled. In contrast, during the first condition decision 108, IF a user enabled operation condition of the vehicle off-guard monitoring system 10==NOT TRUE a first NO identifier 114 is generated triggering initiation of a second condition decision 116.

Figure 3:
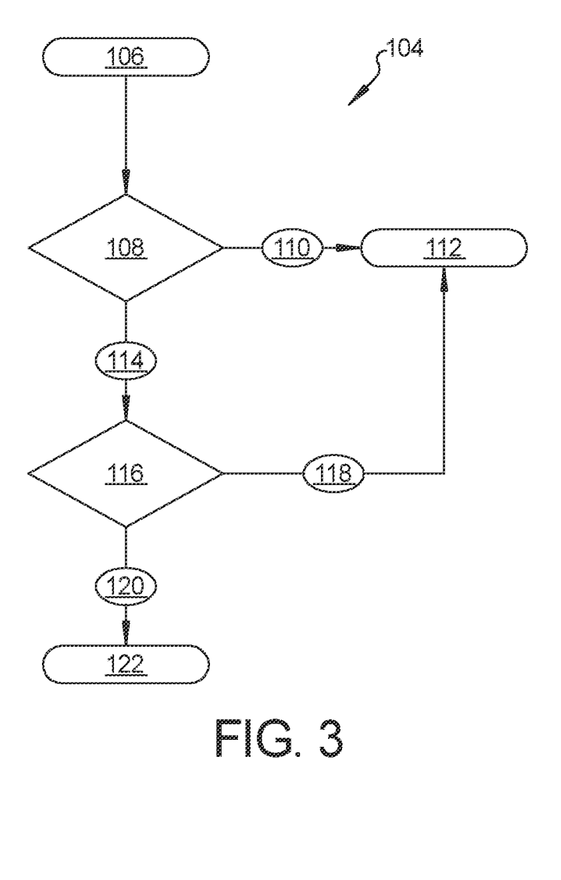
FIG. 3 is a flow diagram identifying initial enablement conditions required to operate the vehicle off-guard monitoring system.

During the second condition decision 116 identification if the automobile vehicle 12 is an electrically powered vehicle is confirmed and a determination is made if the automobile vehicle 12 is plugged in to a charging port, which indicates if a temporary sensing operation may have power available. IF during the second condition decision 116 a vehicle plugged-in operating condition of the vehicle off-guard monitoring system 10==TRUE, a second YES identifier 118 is generated and forwarded to the enablement operation block 112 and a temporary sensing-only feature of the vehicle off-guard monitoring system 10 is enabled. IF during the second condition decision 116 a vehicle plugged-in operating condition of the vehicle off-guard monitoring system 10==NOT TRUE, a second NO identifier 120 is generated which initiates a stand-by operation condition 122 of the vehicle off-guard monitoring system 10.

Referring to FIG. 4 and again to FIGS. 1 through 3, an operation flowchart 124 identifies operational steps performed by and a method to operate the vehicle off-guard monitoring system 10. In a camera monitoring step 126 vehicle on-board 360-degree cameras including the forward-facing camera 14 and the rear-facing camera 16 are operated periodically and returned camera images are analyzed to identify if any of the hazards identified in reference to FIG. 1 are indicated. In a sensor monitoring step 128 signals generated by any of the internal and external temperature sensors including the temperature sensors 18 and humidity sensors including the humidity model 20 are received which may identify if any change in temperature or humidity has occurred within a sensor operating range in a surrounding area proximate to the automobile vehicle 12. In a processing step 130, the signals generated by any of the internal and external temperature sensors including the temperature sensors 18 and humidity sensors including the humidity model 20 are processed to identify a type of hazard and to prepare the automobile vehicle 12 to respond accordingly.

Figure 4:
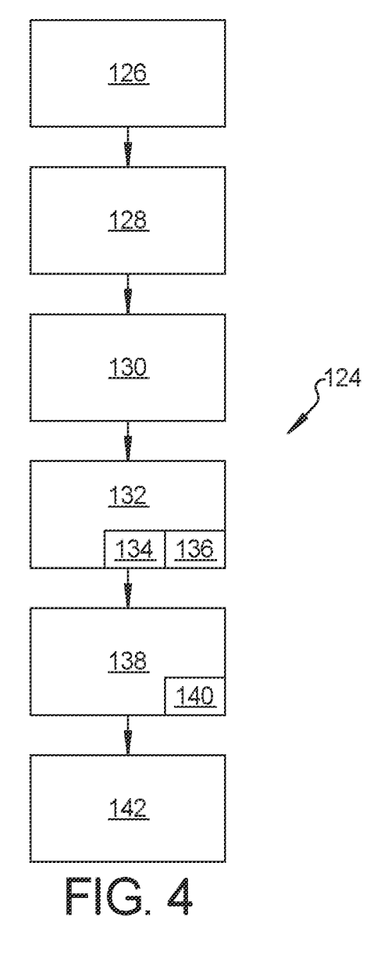
FIG. 4 is a flow diagram identifying data collection and data analysis steps to identify if data collected substantially matches images saved in a memory.

In a following comparison step 132, algorithms are applied to compare images created using the signals generated by the vehicle on-board 360-degree cameras including the forward-facing camera 14 and the rear-facing camera 16 to multiple sample images 134 available and stored in a memory 136 located for example in the data collection unit 24 or in the computer 50. The sample images 134 may for example define garage fires, excessive water levels for example in comparison to wheels of the automobile vehicle or as moving water proximate to the automobile vehicle 12. The sample images 134 may also define for example rainfall events, snow events, open windows of the automobile vehicle 12 and exemplary surveillance images indicating one or more persons at or proximate to the automobile vehicle 12.

In a following warning generation step 138 upon a successful image match between the images created using the signals generated by the vehicle on-board 360-degree cameras and the sample images 134, or if a substantial change in temperature or humidity has occurred when compared to threshold temperature and humidity conditions also saved in the memory 136, indicating a possible fire or water hazard, the algorithm or algorithms generate a predefined warning 140 forwarded to the user 28 of the automobile vehicle 12 for example via the wireless device 46. If a hazard condition is identified the vehicle off-guard monitoring system 10 generates signals to prepare the automobile vehicle 12 accordingly, for example by opening contactors used to charge the automobile vehicle batteries, initiate a panic alarm to warn or warn off other people in the immediate area of the automobile vehicle 12 such as by sounding a vehicle horn, and closing any open vehicle windows.

In a following reporting step 142, the vehicle off-guard monitoring system 10 may automatically connect to the software subscription service 96 described in reference to FIG. 2 and report the hazard condition identified. If the automobile vehicle 12 defines an autonomous vehicle, commands may be generated to automatically move the automobile vehicle 12 to a predefined distance away from the hazard area.

Referring to FIG. 5 and again to FIGS. 1 through 4, an enabled feature flow diagram 144 for the vehicle off-guard monitoring system 10 is initiated by the user 28 of the automobile vehicle 12 performing an enablement step 146 which initiates operation of the camera system including the forward-facing camera 14 and the rear-facing camera, and initiates capture of vehicle internal and external temperature data using the one or more temperature sensors 18 discussed in reference to FIG. 1. In a collection step 150 external images about the automobile vehicle 12 are collected using the camera system and the temperature sensors 18, and predetermined images saved in a vehicle on-board database 152 are imported and all of the collected images are compared. The on-board database 152 may save classified and distinct hazard images such as samples depicting exemplary garage fires, floods, vehicle thefts. The classification of the data in the on-board database 152 may be separated to distinguish different degrees of the hazards. The classification is used to generate different working thresholds, such as temperature thresholds which distinguish between the different degrees of the hazards.

Figure 5:
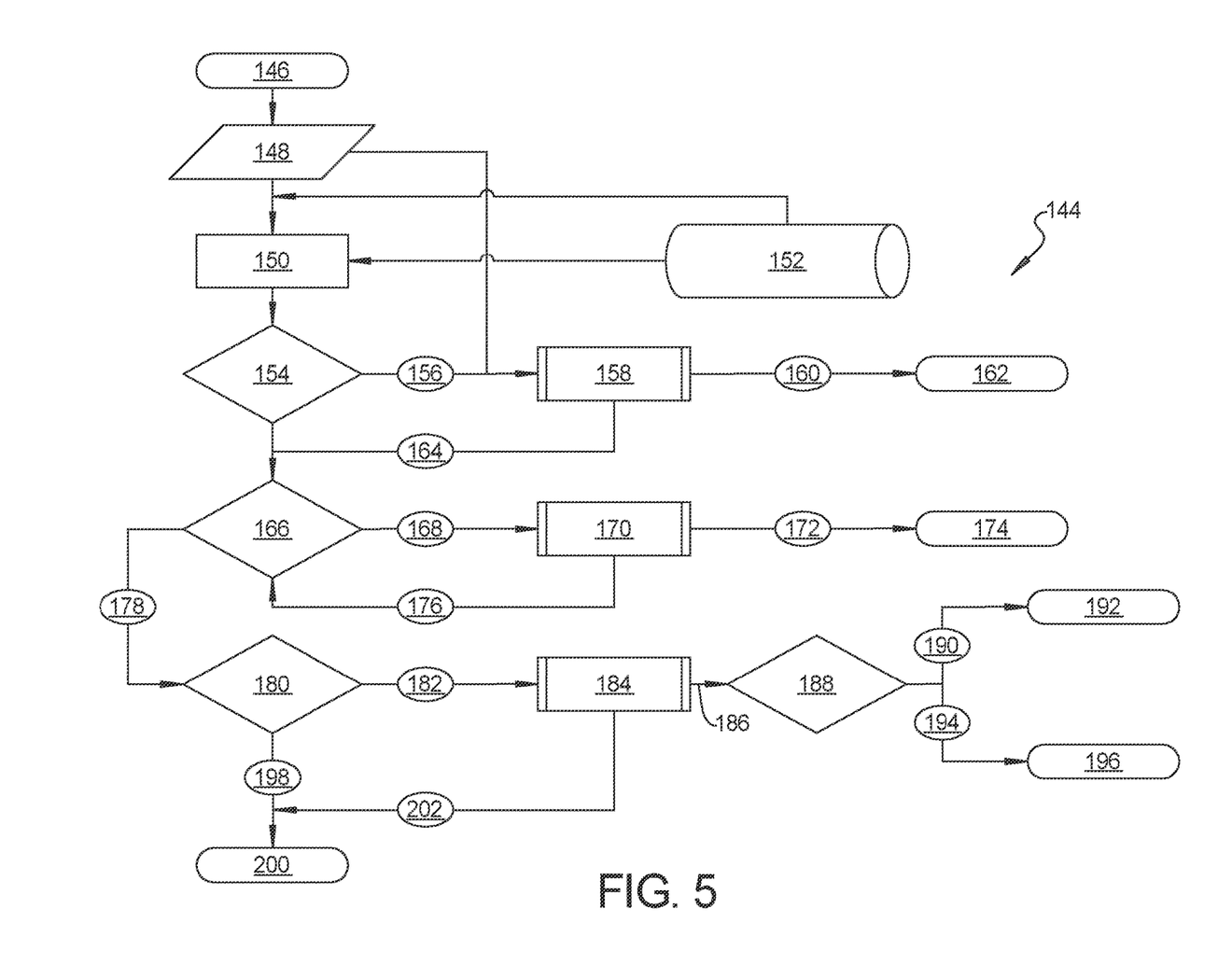
FIG. 5 is a flow diagram expanding on FIG. 4 to further identify if a fire hazard, a flooding hazard or an open window is present and notification steps to take.

In a first match determination step 154 a determination is made if a match exists between the collected external images and the data retrieved from the on-board database 152 signifying a fire such as a garage fire may be present in the proximity of the automobile vehicle 12. If a response to the first match determination step 154 is YES a first signal 156 is sent to a fire hazard monitoring protocol 158, wherein a continuing periodic check is performed to identify if a rise in area temperature is occurring, and if a rapid change in outside humidity is occurring, and a reading is conducted of air quality using the air quality sensors 22 discussed in reference to FIG. 1. An identified rise in temperature is compared to a predetermined temperature threshold saved for example in the memory 136. If the rise in temperature greater than the temperature threshold is YES, a first hazard signal 160 is generated and sent to the user 28 via a fire hazard notification 162 presented for example in the application the user 28 has acquired for use in the wireless device 46 such as a smart phone, thereby notifying the user 28 of the potential of a fire hazard proximate to the automobile vehicle 12. If the rise in temperature greater than the temperature threshold is NO, the program in a first return step 164 returns to fire hazard monitoring protocol 158, wherein the continuing periodic check is performed to identify if a rise in area temperature is occurring.

Following or in parallel with the fire hazard monitoring protocol 158, the program continues to a second match determination step 166 wherein a determination is made if a match exists between the collected external images and the data retrieved from the on-board database 152 signifying a flooding event such as a rapid rising water level may be present in the proximity of the automobile vehicle 12. If a response to the second match determination step 166 is YES a second signal 168 is sent to a flooding hazard monitoring protocol 170, wherein a continuing periodic check is performed to identify if a rise in area humidity is occurring, and if a rise in water level is occurring by sequential image comparison. An identified rise in humidity and an identified rise in water level is compared to a predetermined humidify and water level threshold saved for example in the memory 136. If the rise in humidity and water level greater than the humidity and water level threshold is YES, a second hazard signal 172 is generated and sent to the user 28 via a flooding notification 174 presented for example in the application the user 28 has acquired for use in the wireless device 46 such as a smart phone, thereby notifying the user 28 of the potential of a flooding hazard occurring proximate to the automobile vehicle 12. If the rise in humidity and water level greater than the temperature threshold is NO, the program in a second return step 176 returns to the flooding hazard monitoring protocol 170, wherein the continuing periodic check is performed to identify if a rise in area humidity and water level is occurring.

If the rise in humidity and water level greater than the temperature threshold is NO as noted above, the program in a continuation step 178 also continues to a third match determination step 180 wherein a determination is made if a match exists between the collected external images and the data retrieved from the on-board database 152 signifying a precipitation event such as a rainstorm or snowstorm may be present in the proximity of the automobile vehicle 12. If a response to the third match determination step 180 is YES a third signal 182 is sent to a vehicle window position monitoring protocol 184, wherein a check is performed to determine if any of the windows of the automobile vehicle 12 are in an open or a partially open position. If any one window position is NOT closed, an ignition check signal 186 is generated and sent to an ignition monitoring protocol 188 wherein a determination is made if the vehicle ignition is ON. If a response to the ignition monitoring protocol 188 is YES a fourth signal 190 is sent to the vehicle display device human-machine-interface (HMI) processor 62 which generates a display 192 for the center stack display 64 within the automobile vehicle 12 providing visual system data to the user 28 of the automobile vehicle 12. If a response to the ignition monitoring protocol 188 is NO indicating the vehicle ignition is not on, a fifth signal 194 is generated and sent to the user 28 via a water/snow hazard indication 196 presented for example in the wireless device 46, thereby notifying the user 28 of the potential of a window being open during a precipitation event occurring proximate to the automobile vehicle 12.

If a response to the third match determination step 180 is NO, indicating a precipitation event is not occurring, a first stand-by signal 198 is sent to generate a system stand-by condition 200. In addition, if a response to the vehicle window position monitoring protocol 184 is NO, indicating that none of the windows of the automobile vehicle 12 are in an open or a partially open position, a second stand-by signal 202 is sent to confirm the system stand-by condition 200.

Referring to FIG. 6 and again to FIGS. 1 through 5, a flow diagram 204 presents high level mitigation actions that may be taken by the vehicle off-guard monitoring system 10 when the fire hazard notification 162 or the flooding notification 174 discussed in reference to FIG. 5 are generated. Multiple different thresholds may be applied to further distinguish a further action to be taken. Upon generation of the fire hazard notification 162 a first fire hazard analysis check 206 is performed. During the first fire hazard analysis check 206 a determination is made IF a timer value is greater than a first fire hazard threshold AND a temperature change is greater than a first temperature threshold AND the vehicle ignition is OFF. If all of the conditions of the first fire hazard analysis check 206 are not met the program in a first repeat step 208 returns to and reperforms the first fire hazard analysis check 206. If all of the conditions of the first fire hazard analysis check 206 are met the program identifies if the automobile vehicle 12 is an electrical vehicle and in a first termination operation 212 opens electrical contactors to terminate a charging operation if the vehicle is plugged in for charging and charging is actively underway, AND the program moves to a second fire hazard analysis check 210.

Figure 6:
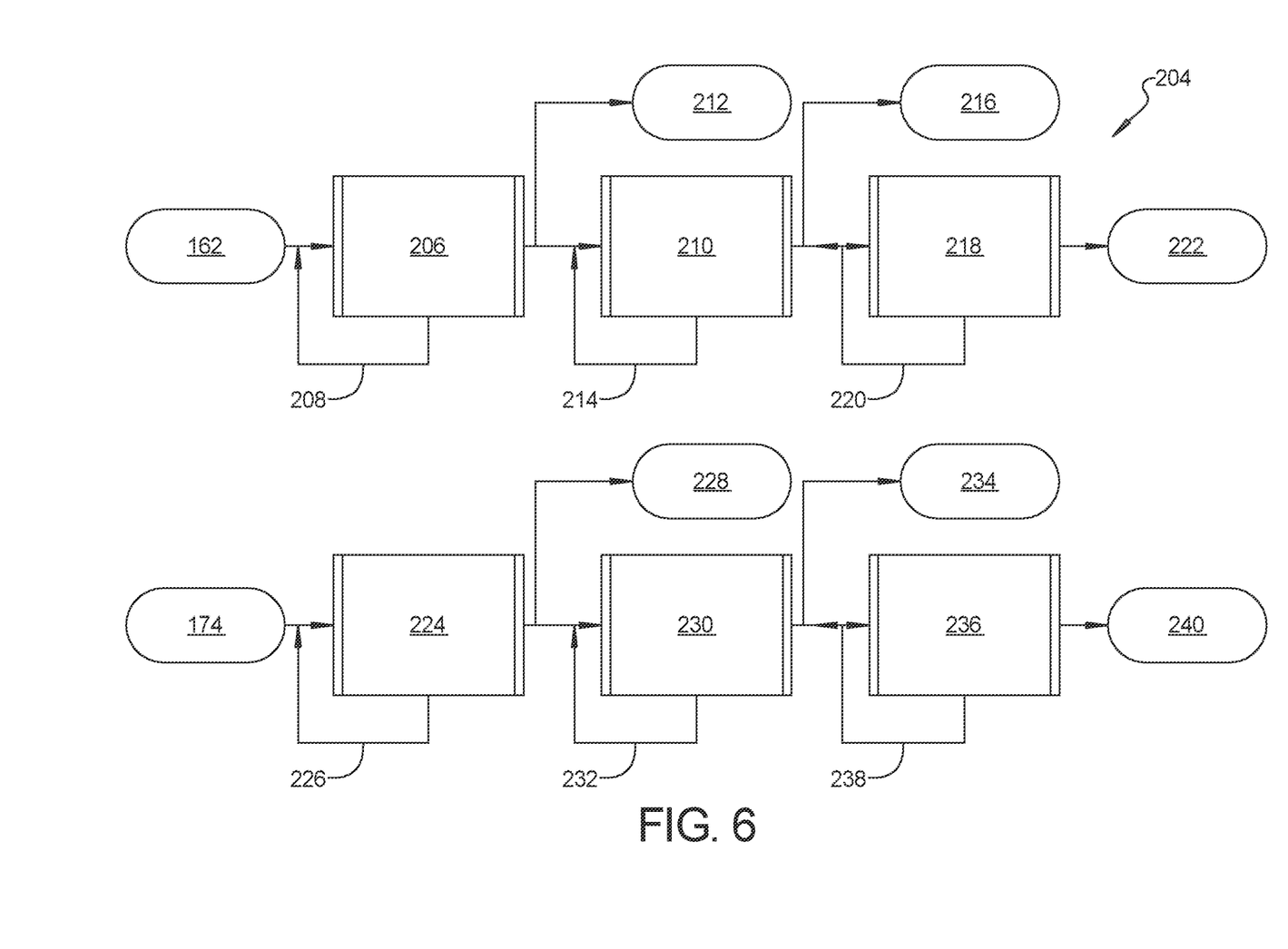
FIG. 6 is a flow diagram defining high level feature mitigation actions to be taken in the event a hazard is identified applying multiple different thresholds.

During the second fire hazard analysis check 210 a determination is made IF a timer value is greater than a second fire hazard threshold AND a temperature change is greater than a second temperature threshold AND the vehicle ignition is OFF. If all of the conditions of the second fire hazard analysis check 210 are not met the program in a second repeat step 214 returns to and reperforms the second fire hazard analysis check 210. If all of the conditions of the second fire hazard analysis check 210 are met the program initiates a vehicle panic alarm 216, AND the program moves to a third fire hazard analysis check 218.

During the third fire hazard analysis check 218 a determination is made IF a timer value is greater than a third fire hazard threshold AND a temperature change is greater than a third temperature threshold AND the vehicle ignition is OFF. If all of the conditions of the third fire hazard analysis check 218 are not met the program in a third repeat step 220 returns to and reperforms the third fire hazard analysis check 218. If all of the conditions of the third fire hazard analysis check 218 are met the program in a first notification step 222 contacts the software subscription service 96 described in reference to FIG. 2 and shares images of the fire hazard identified. Further, if the automobile vehicle 12 is an autonomous vehicle, commands are initiated to move the automobile vehicle 12 away from the area where the fire hazard is occurring.

Upon generation of the flooding notification 174 a first flooding hazard analysis check 224 is performed. During the first flooding hazard analysis check 224 a determination is made IF a timer value is greater than a first flooding hazard threshold AND a water level change is greater than a first water level threshold AND the vehicle ignition is OFF. If all of the conditions of the first flooding hazard analysis check 224 are not met the program in a fourth repeat step 226 returns to and reperforms the first flooding hazard analysis check 224. If all of the conditions of the first flooding hazard analysis check 224 are met the program identifies if the automobile vehicle 12 is an electrical vehicle and in a second termination operation 228 opens electrical contactors to terminate a charging operation if the vehicle is plugged in for charging and charging is actively underway, AND the program moves to a second flooding hazard analysis check 230.

During the second flooding hazard analysis check 230 a determination is made IF a timer value is greater than a second flooding hazard threshold AND a water level change is greater than a second water level threshold AND the vehicle ignition is OFF. If all of the conditions of the second flooding hazard analysis check 230 are not met the program in a fifth repeat step 232 returns to and reperforms the second flooding hazard analysis check 230. If all of the conditions of the second flooding hazard analysis check 230 are met the program initiates a vehicle panic alarm 234, AND the program moves to a third flooding hazard analysis check 236.

During the third flooding hazard analysis check 236 a determination is made IF a timer value is greater than a third flooding hazard threshold AND a water level change is greater than a third water level threshold AND the vehicle ignition is OFF. If all of the conditions of the third flooding hazard analysis check 236 are not met the program in a sixth repeat step 238 returns to and reperforms the third flooding hazard analysis check 236. If all of the conditions of the third flooding hazard analysis check 236 are met the program in a second notification step 240 contacts the software subscription service 96 described in reference to FIG. 2 and shares images of the flooding hazard identified. Further, if the automobile vehicle 12 is an autonomous vehicle, commands are initiated to move the automobile vehicle 12 away from the area where the flooding hazard is occurring.

Referring to FIG. 7 and again to FIGS. 1 through 6, a flow diagram 242 presents high level surveillance monitoring features that may be provided by the vehicle off-guard monitoring system 10. The surveillance monitoring features are initiated by the user 28 performing an enablement step 244 which selects ones or all of the cameras of the camera system including the forward-facing camera 14 and the rear-facing camera to monitor zones specified by the user 28. The enablement step 244 also allows the user 28 to identify preferred monitoring system alarms. The preferred monitoring system alarms may include but are not limited to alerts if the automobile vehicle 12 is backing up, to alerts if a pedestrian is crossing one of the monitored zones of the cameras and can be modified to identify predetermined time windows.

Figure 7:
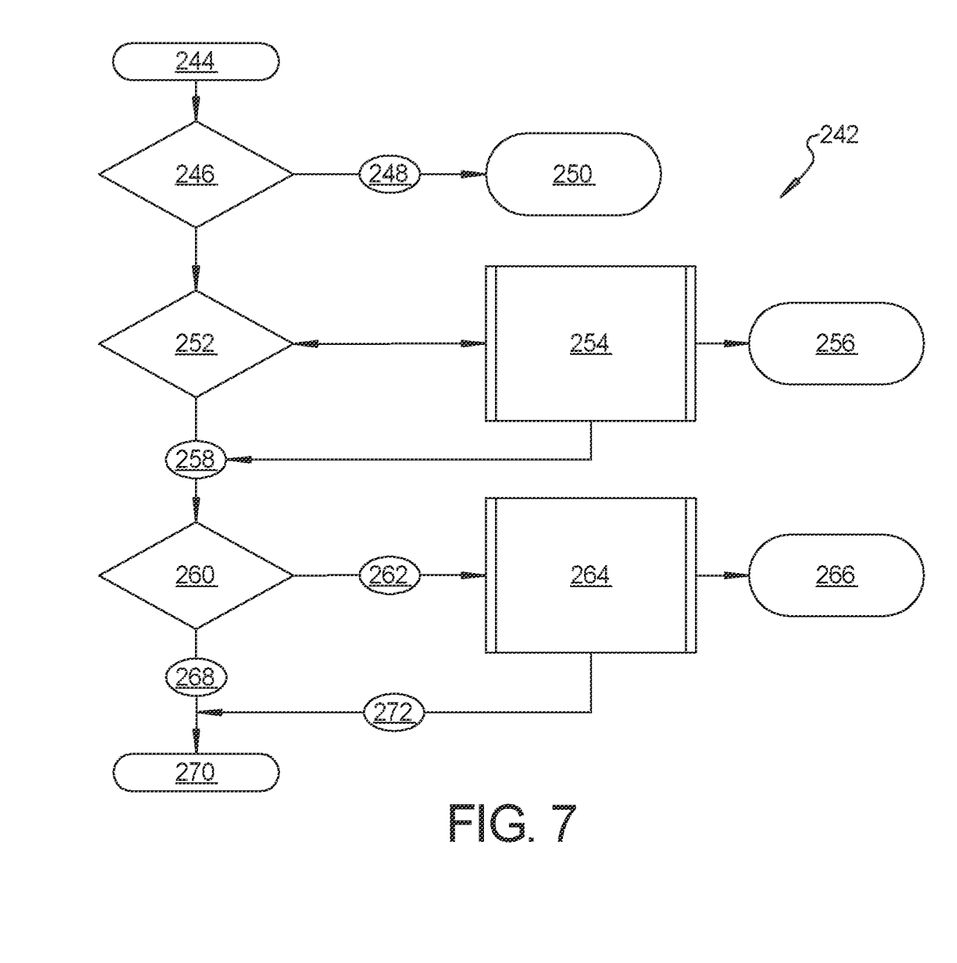
FIG. 7 is a flow diagram defining high level camera surveillance features of the vehicle off-guard monitoring system.

Following the enablement step 244 a first enablement check 246 is conducted to identify if the user 28 enabled the system via the vehicle HMI. If an answer to the first enablement check 246 is NO the system goes into an initial standby mode 250. If an answer to the first enablement check 246 is YES, a second enablement check 252 is conducted to identify if the user 28 enabled a DEFAULT ALL condition which initiates operation of all of the automobile vehicle cameras. If the user 28 did enable the DEFAULT ALL condition the second enablement check 252 initiates a driver preferred monitoring protocol 254. In the driver preferred monitoring protocol 254 all vehicle cameras are enabled with user preferred monitoring conditions applied including monitoring if the automobile vehicle 12 is backing up and providing pedestrian monitoring within any predesignated monitoring zones. If all of the vehicle cameras are enabled, a first instant notification 256 is generated and forwarded to the wireless device 46 of the user 28 if any monitored event identified by one or all of the cameras occurs.

If during operation of the driver preferred monitoring protocol 254 a first null event 258 is identified wherein NOT all of the vehicle cameras are enabled OR no monitored event is identified by any or all of the cameras, the system performs an enablement continuation step 260. The enablement continuation step 260 is conducted to identify if the user 28 enabled for example only one of the cameras such as the forward-facing camera 14, the rear-facing camera 16 or optionally one or more side facing cameras. If the enablement continuation step 260 returns a YES signal 262 indicating the user 28 enabled only one of the cameras, the system overrides the single camera enablement command and initiates an override driver preferred monitoring protocol 264 which acts similar to the driver preferred monitoring protocol 254 and enables all automobile cameras. After all of the cameras have been enabled, a second instant notification 266 is generated and forwarded to the mobile application 66 which may be saved in and operated using the wireless device 46 of the user 28 if any monitored event identified by one or all of the cameras occurs.

If during operation of the enablement continuation step 260 a second null event 268 is identified wherein any one of the vehicle cameras are not enabled OR no monitored event is identified by any or all of the enabled cameras, the system enters a second or final standby mode 270.

The computer 50 described in reference to FIG. 2 is a non-generalized, electronic control device having a preprogrammed digital controller or processor, memory or non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code.

The Vehicle Off-Guard Monitoring System 10 and method of operation provides suitable notifications to a user such as a driver or a vehicle operator present in the automobile vehicle 12 or located remotely from the automobile vehicle 12 via a smart phone application by analyzing potential hazards around the automobile vehicle such as garage fires, excessive water or potential flooding or rain, snow or rain with unintended open windows, and electable camera security surveillance around the automobile vehicle.

Driver Enforced Enablement: The user, driver or operator can enable monitoring via an HMI/mobile application. The vehicle off-guard monitoring system 10 utilizes on-board 360-degree cameras to periodically monitor for hazards, and internal and external temperature sensors for continuous monitoring of change in temperatures in and around the automobile vehicle. The vehicle off-guard monitoring system 10 captures images and temperature readings which are processed to identify a type of hazard and prepare the automobile vehicle to respond accordingly.

Algorithms compare the captured images against an available onboard database of hazard images. Upon a successful image match and/or a rise in temperature surpassing a threshold temperature surpassing a predetermined temperature increase rate a fire hazard is confirmed. The algorithm generates a suitable predefined warning to the user via a phone application which may be used to open high voltage contactors or generate a panic alarm in case of extreme fire, flooding or upon detecting a vehicle break-in.

The vehicle off-guard monitoring system 10 allows the user to select any external vehicle camera(s) from a multiple external camera hardware package to specify one or more zones of monitoring while also allowing the user to customize a type of monitoring, such as to alert if pedestrians are walking too closely to the host automobile vehicle, or if a different vehicle is getting too close to the host vehicle while backing up on a driveway or the like.

The vehicle off-guard monitoring system 10 uses multi-sensor data interpretation while the user is away or is inattentive. For example, the automobile vehicle may connect to a remote database such as OnStar® and report hazard(s) so that suitable action can be taken immediately.

If the host automobile vehicle is an automated or autonomously operated vehicle, the automobile vehicle can self-initiate movement to remove itself from the hazardous situation.

A methodology of the present disclosure utilizes on-board vehicle sensors such as external cameras, temperature sensors, humidity sensors and air quality sensors to detect hazardous conditions such as fire, high water level, unexpected visitors, and also mine for a suspected vehicle in the host automobile vehicle proximity.

The vehicle off-guard monitoring system 10 of the present disclosure utilizes off-board inputs including global positioning system (GPS), road databases and vehicle-to-vehicle (V2X) communication. The vehicle off-guard monitoring system 10 may interact with any of: a user such as an operator, an off-site or on-cloud monitoring system, a Police Department, and may determine if the host automobile vehicle is an automated or condition vehicle. According to several aspects, if the host automobile vehicle is provided with autonomous operation the automobile vehicle may operate automatically to remove itself from the hazardous situation upon identifying a hazardous event.

The vehicle off-guard monitoring system 10 of the present disclosure provides software-as-a-service (SaaS) features for communication with a police department. The vehicle off-guard monitoring system 10 may also include: vehicle sensors such as temperature sensors, humidity sensors, air quality sensors, vehicle exterior cameras and proximity sensors.

A vehicle off-guard monitoring system 10 of the present disclosure provides enablement of a system which can be controlled by a vehicle user in all cases via an HMI/mobile device application. By utilizing 360-degree coverage cameras and temperature and humidity sensors all integrated with image detection techniques, image database and temperature thresholds, the automobile vehicle may identify hazards such as garage fires, excessive water or potential flooding, rain or snow with unintended open windows, video security surveillance at an owner's home or workplace and proximity in a local neighborhood.

Upon identifying any of the hazards identified herein, the automobile vehicle may immediately notify the user via a smart-phone application or contact a remote service such as On-star® upon occurrence of a delayed response. If the automobile vehicle defines an automated or autonomous vehicle, the automated vehicle can move itself away from the hazard situation. This capability allows the user to select any external vehicle camera(s) from a multiple external camera hardware package to specify zones of monitoring while it also allows the user to customize the type of monitoring, such as to alert if people are walking too closely to the host automobile vehicle, or if another vehicle is getting too close for example while backing up on a driveway and the like.

A vehicle off-guard monitoring system 10 of the present disclosure offers several advantages. These include use of multiple inputs such as temperature sensors, humidity models, air quality sensors, and exterior cameras to monitor any major or minor hazards including garage fires, excessive water or flooding, rain, snow, or loitering with on-demand security video surveillance. The vehicle off-guard monitoring system 10 informs a user such as an operator via a smart-phone application and a remote system including On-star® in time to avoid any severe damage to the host automobile vehicle or surroundings. If the automobile vehicle is an autonomous vehicle, the automobile vehicle may initiate movement to remove itself from the situation. Based on the user's consent, an additional feature is included enabling the automobile vehicle to identify, locate and report events utilizing surrounding external cameras.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for operating a vehicle off-guard monitoring system of a vehicle, comprising:
    capturing, while the vehicle is parked and a vehicle ignition of the vehicle is off, multiple sensor inputs defining sensor data from cameras mounted on the vehicle, the sensor data including images of an environment proximate to the vehicle;
    comparing, using a controller in the vehicle, multiple images of fire hazards stored in a database to the multiple sensor inputs to identify at least one match exists between any one of the multiple sensor inputs and any one of the multiple images of fire hazards;
    identifying a fire hazard in the environment proximate the vehicle when the at least one match exists;
    generating a predefined warning signal identifying the fire hazard when the at least one match exists;
    signaling the predefined warning signal to a user of the vehicle and performing a first fire hazard analysis check when the at least one match exists;
    wherein the first fire hazard analysis check includes:
        initiating a timer value;
        periodically sensing a temperature in the environment proximate the vehicle;
        comparing the timer value to a first fire hazard threshold;
        comparing a temperature change in the environment proximate the vehicle, derived from the periodically sensed temperature, to a first temperature threshold;
        terminating a charging operation of the vehicle when the timer value is greater than the first fire hazard threshold and the temperature change is greater than the first temperature threshold and performing a second fire analysis check;
    wherein the second fire analysis check includes:
        comparing the timer value to a second fire hazard threshold;
        comparing another temperature change in the environment proximate the vehicle, derived from the periodically sensed temperature, to a second temperature threshold;
        initiating a vehicle panic alarm when the timer value is greater than the second fire hazard threshold and the temperature change is greater than the second temperature threshold and performing a third fire analysis check;
    wherein the third fire analysis check includes:
        comparing the timer value to a third fire hazard threshold;
        comparing another temperature change in the environment proximate the vehicle, derived from the periodically sensed temperature, to a third temperature threshold;
        sharing images of the fire hazard from the multiple sensor inputs with the user of the vehicle via a software subscription service when the timer value is greater than the third fire hazard threshold and the temperature change is greater than the third temperature threshold; and
        moving the vehicle autonomously away from the fire hazard.

2. The method of claim 1, wherein upon determining the match exists, further including:
    determining if a change in outside humidity is occurring; and
    conducting a reading of air quality using air quality sensors.

3. The method of claim 2, further including:
    comparing, using the controller in the vehicle, multiple images of flood hazards stored in the database to the multiple sensor inputs to identify at least one match exists between any one of the multiple sensor inputs and any one of the multiple images of flood hazards;
    determining if the match exists between the multiple sensor inputs and the images of the flood hazards retrieved from the database signifying a flooding event defining a rising water level is present in the environment proximate the vehicle;
    conducting a periodic check to identify if a rise in a humidity is occurring when the rising water level is present by a sequential image comparison; and
    comparing the rise in the humidity and the rising water level to a predetermined humidify threshold and a water level threshold and when the rise in the humidity and the rising water level is greater than the predetermined humidify threshold and the water level threshold, a water level hazard signal is generated and sent to the user via a flooding notification.

4. The method of claim 3, further including:
    determining if a first timer is greater than a first time threshold and if a delta temperature is greater than a first temperature threshold;
    identifying if a second timer is greater than a second time threshold and a water level is greater than the water level threshold; and
    opening a contactor to terminate vehicle battery charging.

5. The method of claim 1, further including capturing visual data proximate to the automobile vehicle also representing the hazards using multiple cameras.

6. The method of claim 1, further including selecting at least one zone of coverage of at least one of the cameras by the user of the vehicle and monitoring the selected at least one zone.

7. The method of claim 1, further including using a smart-phone application in communication with the computer and a remote system.

8. A method for operating a vehicle off-guard monitoring system of a vehicle, comprising:
    capturing, while the vehicle is parked and a vehicle ignition of the vehicle is off, multiple sensor inputs defining sensor data from cameras mounted on the vehicle, the sensor data including images of an environment proximate to the vehicle;
    comparing, using a controller in the vehicle, the multiple images of flooding hazards stored in a database to the multiple sensor inputs
    to identify if at least one match exists between any one of the multiple sensor inputs and any one of the multiple images of flooding hazards;
    identifying a flooding hazard in the environment proximate the vehicle when at least one match exists;
    generating a predefined warning signal identifying the flooding hazard when the at least one match exists;

signaling the predefined warning signal to a user of the vehicle and performing a first flooding hazard analysis check when at least one match exists;

wherein the first flooding hazard analysis check includes:
- initiating a timer value;
- periodically sensing a water level in the environment proximate the vehicle;
- comparing the timer value to a first flooding hazard threshold;
- comparing a water level change in the environment proximate the vehicle, derived from the periodically sensed water level, to a first water level threshold;
- terminating a charging operation of the vehicle when the timer value is greater than the first flooding hazard threshold and the water level change is greater than the first water level threshold and performing a second flooding hazard analysis;

wherein the second flooding hazard analysis check includes:
- comparing the timer value to a second flooding hazard threshold;
- comparing another water level change in the environment proximate the vehicle, derived from the periodically sensed water level, to a second water level threshold;
- initiating a vehicle panic alarm when the timer value is greater than the second flooding hazard threshold and the water level change is greater than the second water level threshold and performing a third flooding hazard analysis check;

wherein the third flooding hazard analysis check includes:
- comparing the timer value to a third flooding hazard threshold;
- comparing another water level change in the environment proximate the vehicle, derived from the periodically sensed water level, to a third water level threshold;
- sharing images of the flooding hazard from the multiple sensor inputs with the user of the vehicle via a software subscription service when the timer value is greater than the third flooding hazard threshold and the water level change is greater than the third water level threshold; and
- moving the vehicle autonomously away from the flooding hazard.

9. The method of claim 8, further including signaling the predefined warning signal to a user of the automobile vehicle to mitigate against damage occurring to the automobile vehicle.

10. The method of claim 9, further including using a smart-phone application in communication with the computer and a remote system when signaling the predefined warning signal.

* * * * *